(12) United States Patent
Namiki et al.

(10) Patent No.: US 12,505,393 B2
(45) Date of Patent: Dec. 23, 2025

(54) MANAGEMENT SYSTEM AND MANAGEMENT METHOD

(71) Applicant: HONDA MOTOR CO., LTD., Tokyo (JP)

(72) Inventors: Shohei Namiki, Tokyo (JP); Katsuya Takegoshi, Tokyo (JP); Satoshi Murata, Tokyo (JP); Sota Sakaguchi, Raymond, OH (US); Yuko Furuichi, Raymond, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 66 days.

(21) Appl. No.: 18/088,892

(22) Filed: Dec. 27, 2022

(65) Prior Publication Data

US 2024/0211833 A1 Jun. 27, 2024

(51) Int. Cl.
*G06Q 10/0631* (2023.01)
*G05D 1/00* (2024.01)

(52) U.S. Cl.
CPC ... *G06Q 10/063114* (2013.01); *G05D 1/0022* (2013.01)

(58) Field of Classification Search
CPC ............ G06Q 10/063114; G05D 1/0022
(Continued)

(56) References Cited

U.S. PATENT DOCUMENTS

| | | | |
|---|---|---|---|
| 11,746,500 B2 * | 9/2023 | Kobel | E02F 9/265 701/2 |
| 12,062,285 B2 * | 8/2024 | Wada | G08G 1/148 |

(Continued)

FOREIGN PATENT DOCUMENTS

| | | | |
|---|---|---|---|
| JP | 2019-175132 | | 10/2019 |
| JP | 2019175132 A | * | 10/2019 |
| JP | 2023137549 A | * | 9/2023 |

*Primary Examiner* — Abdallah A El-Hage Hassan
(74) *Attorney, Agent, or Firm* — Amin, Turocy & Watson, LLP

(57) ABSTRACT

Even if there is equipment that does not transmit positional information, a work area in which the equipment operates is determined.

A management system includes a first communication device, a second communication device, and a server device, the first communication device includes a first operation information acquisition unit configured to acquire first equipment operation information, a second communication unit configured to acquire second equipment operation information from the second communication device, a positional information acquisition unit configured to acquire positional information, and a first communication unit configured to transmit integrated information, the second communication device includes a second operation information acquisition unit configured to acquire second equipment operation information, and a second communication unit configured to transmit second equipment operation information, and the server device includes an integrated information acquisition unit configured to acquire integrated information, an area information storage unit configured to store area information, a site determination unit configured to determine a site from which the integrated information is transmitted, a work time specifying unit configured to specify work time, a first specifying unit configured to specify time and a place in which first equipment is used, and a second specifying unit configured to specify time and a place in which second equipment is used.

12 Claims, 10 Drawing Sheets

(58) Field of Classification Search
USPC .......................................................... 705/7.26
See application file for complete search history.

(56) References Cited

U.S. PATENT DOCUMENTS

2021/0109497 A1\* 4/2021 Man ................... G06Q 10/0635
2022/0180282 A1\* 6/2022 Powell ................. G05D 1/0246

\* cited by examiner

FIG. 2

| | 6:00AM | 7:00AM | 8:00AM | 9:00AM | 10:00AM | 11:00AM | 12:00PM | 1:00PM | 2:00PM | 3:00PM | 4:00PM | 5:00PM | 6:00 |
|---|---|---|---|---|---|---|---|---|---|---|---|---|---|
| FIRST CREW | | W1 ON-TIME ⊙ 7:23AM – 9:41AM WORK NAME SITE NAME | | | W2 ON-TIME ⊙ 9:47AM – 2:10PM WORK NAME SITE NAME | | | | | | | | |
| SECOND CREW | | W3 ON-TIME ⊙ 6:57AM – 10:40AM WORK NAME SITE NAME | | | | W4 ON-TIME ⊙ 11:05AM – 1:56PM WORK NAME SITE NAME | | | | | | | |
| THIRD CREW | | | | | | | | | | | | | |

< (Mon) Tue Wed Thu Fri Sat Sun > | Jul 2022
18 19 20 21 22 23 24

MANAGEMENT SYSTEM AND MANAGEMENT METHOD

FIELD

The present invention relates to a management system and a management method.

BACKGROUND

Description of Related Art

Conventionally, at a construction site where work is carried out using a transporter such as a dump truck and a working machine such as a hydraulic excavator that loads the transporter, there has been a construction management system for finding the work status of each machine operating at the construction site. According to such a construction management system, a server monitors the work status of each machine operating at the construction site, and thereby it is possible to manage an overall work at the construction site even if there is work in which two machines are involved. Applying such a management system to landscape gardeners in order to manage an operation status of equipment such as lawn mowers used by the landscape gardeners can be considered.

However, in work performed by landscape gardeners, the work site may be vast. When the work site is vast, there are cases where a plurality of crews (work groups) work in one work site. Even when the plurality of crews work in a vast work site, there has been a need to determine whether equipment such as lawn mowers has been used by any one of the crews. In addition, some equipment such as lawn mowers does not have batteries. It is not easy to acquire positional information on where equipment that does not have batteries is located, and it is not easy to communicate information via Ethernet or the like.

SUMMARY OF THE INVENTION

The present invention has been made in consideration of such circumstances, and one object thereof is to provide a management system and a management method capable of determining a work area in which equipment operates even if there is equipment that does not transmit positional information.

The management system according to the present invention has adopted the following configuration.

(1): A management system according to one aspect of the present invention is a management system that includes a plurality of first communication devices, a plurality of second communication devices, and one or more server devices, in which the first communication device includes a first operation information acquisition unit configured to acquire first equipment operation information, which is information on an operation status of first equipment, from the first equipment, a second communication unit configured to acquire second equipment operation information, which is information on an operation status of second equipment, from the second communication device, a positional information acquisition unit configured to acquire positional information on position coordinates at which a host device is present, and a first communication unit configured to transmit integrated information in which the acquired first equipment operation information, second equipment operation information, and positional information are associated with each other in a first communication method, the second communication device includes a second operation information acquisition unit configured to acquire the second equipment operation information from the second equipment, and a second communication unit configured to transmit the acquired second equipment operation information by a second communication method different from the first communication method, the server device includes an integrated information acquisition unit configured to acquire the integrated information, an area information storage unit configured to store area information that specifies a range of each of a plurality of sites, and a site determination unit configured to determine a site from which the integrated information is transmitted based on the positional information contained in the integrated information acquired from any one of the first communication devices, wherein, a site in which the second equipment is used is determined on the basis of a time from a specific first communication device enter to a range of any one of sites stored in the area information storage unit to exiting, wherein a specific first communication device is determined based on the positional information contained in the integrated information transmitted from the specific first communication device among the plurality of first communication devices.

(2): In the aspect of (1) described above, during the time from entering, by the specific first communication device, to exiting the range of any one of sites stored in the area information storage unit, it is assumed that the first communication device is present within the site.

(3): In the aspect of (1) or (2) described above, the management system further includes a work time specifying unit configured to specify a time from entering, by the specific first communication device, to exiting a range of any one of sites stored in the area information storage unit based on the positional information contained in the integrated information transmitted from the specific first communication device among the plurality of first communication devices as work time of a crew to which the specific first communication device belongs, a first specifying unit configured to specify a time and a place in which the first equipment is used during the work time, based on the first equipment operation information contained in the integrated information acquired from any one of the first communication devices and a site determined by the site determination unit, and a second specifying unit configured to specify a time and a place in which the second equipment is used during the work time, based on the second equipment operation information contained in the integrated information acquired from any one of the first communication devices and a site determined by the site determination unit.

(4): In any one of the aspects of (1) to (3) described above, when the work time of a plurality of crews is specified at the same site, the second specifying unit specifies a crew that has operated the second equipment depending on whether a plurality of crews are the same crew.

(5): In any one of the aspects of (1) to (4) described above, the first communication device further includes an operator tag information acquisition unit configured to acquire operator tag information for identifying an operator tag corresponding to an operator operating the first equipment, and when the work time of a plurality of crews is specified at the same site and when it is not clearly known which crew has operated the second equipment, the second specifying unit specifies a crew that has operated the second equipment based on the acquired operator tag information.

(6): In any one of the aspects of (1) to (5) described above, the first communication method is a communication method based on an Ethernet standard, and the second communication method is a communication method based on Bluetooth Low Energy (BLE) standard.

(7): In any one of the aspects of (1) to (6) described above, the first equipment is equipment that includes a battery, and the second equipment is equipment that does not include a battery.

(8): In any one of the aspects of (1) to (7) described above, the first communication device used by the work time specifying unit to specify the work time is the first communication device corresponding to the first equipment, which is a vehicle, and the vehicle places and carries the first equipment and the second equipment on a carrier.

(9): In any one of the aspects of (1) to (8) described above, at least one vehicle, as the first equipment, is associated with each of a plurality of crews.

(10): A management method according to another aspect of the present invention is a management method that manages a time and a place in which a plurality of first communication devices and a plurality of second communication devices are used by a server device, and the method includes a first operation information acquisition process of acquiring, by the first communication device, first equipment operation information, which is information on an operation status of first equipment, from the first equipment, a second communication process of acquiring, by the first communication device, second equipment operation information, which is information on an operation status of second equipment, from the second communication device, a positional information acquisition process of acquiring, by the first communication device, positional information on position coordinates at which a host device is present, a first communication process of transmitting, by the first communication device, integrated information in which the acquired first equipment operation information, second equipment operation information, and positional information are associated with each other in a first communication method, a second operation information acquisition process of acquiring, by the second communication device, the second equipment operation information from the second equipment, a second communication process of transmitting, by the second communication device, the acquired second equipment operation information in a second communication method different from the first communication method, an integrated information acquisition process of acquiring, by the server device, the integrated information, an area information storage process of storing, by the server device, area information for specifying a range of each of a plurality of sites, and a site determination process of determining, by the server device, a site from which the integrated information is transmitted based on the positional information contained in the integrated information acquired from any one of the first communication devices, wherein, a site in which the second equipment is used is determined on the basis of a time from a specific first communication device enter to a range of any one of sites stored in the area information storage process to exiting, wherein a specific first communication device is determined based on the positional information contained in the integrated information transmitted from the specific first communication device among the plurality of first communication devices.

(11): In the aspect of (10) described above, during the time from entering, by the specific first communication device, to exiting the range of any one of sites stored in the area information storage process, the first communication device is assumed to be present within the site.

According to the aspects of (1) to (11), even if there is equipment that does not transmit positional information, it is possible to provide a management system and a management method that can determine a work area in which the equipment operates.

BRIEF DESCRIPTION OF THE DRAWINGS

FIG. 2 is a diagram for describing work managed by the server device according to the embodiment.

DETAILED DESCRIPTION

Hereinafter, embodiments of a management device and a management method of the present invention will be described with reference to the drawings. In the following embodiments, an example in which a management device and a management method are applied to landscaping work such as lawn mowing by landscape gardeners will be described. Landscape gardeners constitute a crew with a plurality of workers and a plurality of pieces of equipment such as lawn mowers, and perform landscaping work such as lawn mowing at a work site such as a park. In the following embodiments, a case in which a management device and a management method according to the present embodiment manage an operation status of each of a plurality of crews will be described. However, the present embodiment is not limited to an example of a case of being used by landscape gardeners, and may be applied to various types of work performed by work groups using various equipment. As another embodiment to which the management apparatus and the management method according to the present embodiment are applied, a construction site where working machines, transporters, and the like are in operation can be exemplified.

Outline of Management System

Figure 1:
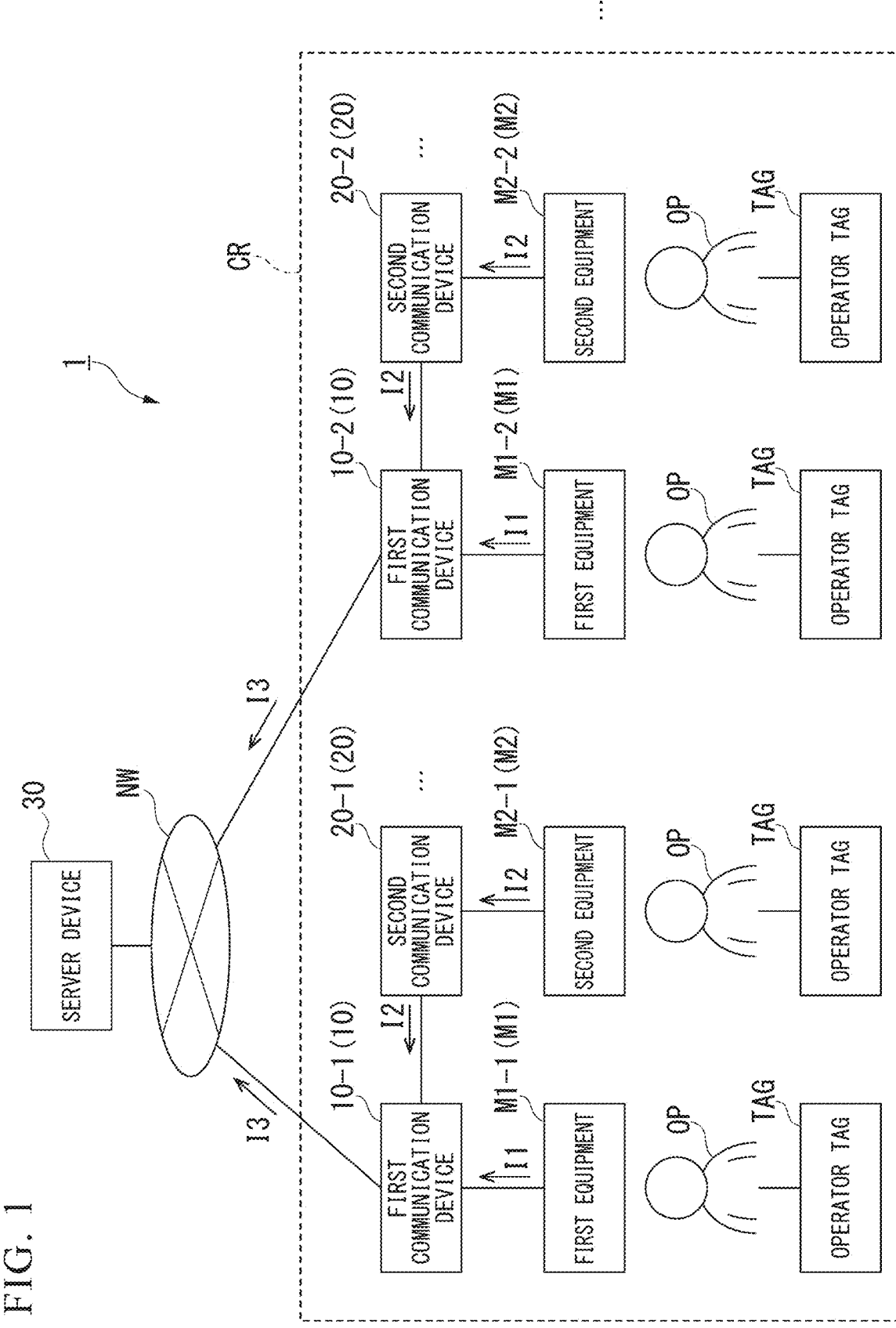
FIG. 1 is a configuration diagram for describing an outline of a management system according to an embodiment.

FIG. 1 is a configuration diagram for describing an outline of a management system according to an embodiment. The outline of the management system 1 will be described with reference to FIG. 1. The management system 1 includes a plurality of first communication devices 10, a plurality of second communication devices 20, and one or more server devices 30. In the shown example, a first communication device 10-1 and a first communication device 10-2 are shown as the first communication devices 10, and a second communication device 20-1 and a second communication device 20-2 are shown as examples of the second communication devices 20.

A working group composed of a plurality of operators OP is described as a crew CR. A plurality of pieces of equipment operated by the plurality of operators OP belong to the crew CR. The plurality of equipment belonging to the crew CR are managed by the management system 1 in terms of use time and use place. In the shown example, one crew CR is described, but the management system 1 according to the present embodiment manages use time, use place, and the like for each of the plurality of equipment operated by a plurality of crews CR.

It is assumed that one of the first communication device 10 and the second communication device 20 is attached to equipment to be managed by the management system 1 according to the present embodiment. In the following description, the equipment to be managed by the management system 1 is classified into first equipment M1 and second equipment M2. The first equipment M1 is, for example, equipment having a battery. Specific examples of the first equipment M1 include lawn mowers, weed cutters, vehicles, and the like in which a battery is mounted. In addition, the second equipment M2 is, for example, equipment that does not have a battery. Specific examples of the second equipment M2 include lawn mowers, weed cutters, blowers, and the like that are not equipped with a battery.

There is a one-to-one correspondence between the first communication device and the first equipment M1. The first communication device 10 acquires information on an operation status of the corresponding first equipment M1. The information on the operation status of the first equipment M1 is also referred to as first equipment operation information I1. In addition, the first communication device 10 acquires information on an operation status of the second equipment M2 from the second communication device 20. The information on the operation status of the second equipment M2 is also referred to as second equipment operation information I2. The first communication device 10 has an information communication function via a communication network NW such as Ethernet (hereinafter referred to as a first communication method) and an information communication function not through the communication network NW such as Ethernet (hereinafter referred to as a second communication method). As a specific example of the first communication method, a communication method based on an Ethernet standard can be exemplified. As a specific example of the second communication method, a communication method based on a Bluetooth Low Energy (BLE) standard can be exemplified. Furthermore, the first communication device 10 acquires positional information of a host device. The positional information of a host device is acquired by, for example, receiving radio waves from artificial satellites such as those of the Global Positioning System (GPS). The first communication device 10 associates the acquired first equipment operation information I1 and second equipment operation information I2 with the positional information of a host device, and outputs it as integrated information I3 to the server device 30 via the communication network NW. Specifically, the first communication device 10 may be a telematics control unit (TCU). The first communication device 10 may perform predetermined bidirectional communication with the second communication device 20 and the server device 30 using two communication methods provided therein.

Note that in the present embodiment, the first communication device 10 and the second communication device 20 do not have a one-to-one correspondence with each other. That is, the first communication device 10 acquires the second equipment operation information I2 from the second communication device 20 present in its vicinity. When a plurality of second communication devices 20 are present around the first communication device 10, the first communication device 10 may acquire the second equipment operation information I2 from each of the plurality of second communication devices 20. When there is no second communication device 20 around the first communication device 10, the first communication device 10 may not acquire the second equipment operation information I2. When the first communication device does not acquire the second equipment operation information I2 from the second communication device 20, the first equipment operation information I1 is associated with the positional information of a host device, and may be output as the integrated information I3 to the server device 30 via the communication network NW.

There is a one-to-one correspondence between the second communication device 20 and the second equipment M2. The second communication device 20 acquires information on the operation status of corresponding second equipment M2. The second communication device 20 does not have the information communication function based on the first communication method, but has the information communication function based on the second communication method. In addition, unlike the first communication device 10, the second communication device 20 does not have the function of acquiring the positional information of a host device. That is, the second communication device 20 cannot directly acquire the positional information of a host device, and cannot directly perform information communication with the server device 30. Therefore, in the present embodiment, the second communication device 20 indirectly transmits information on the operation status of a host device to the server device 30 by transmitting the second equipment operation information I2 to the first communication device 10. Specifically, the second communication device 20 may be a BLE sensor. In the present embodiment, an example in which the second communication device 20 corresponds to the second equipment M2 without a battery will be described, but the second communication device 20 may correspond to equipment with a battery.

The server device 30 acquires the integrated information I3 transmitted from each of the plurality of first communication devices 10. The server device 30 manages a work status of equipment belonging to each of the crews CR based on the acquired plurality of pieces of integrated information I3. As the work status of equipment belonging to each crew CR, the operation statuses of the first equipment M1 and the second equipment M2 belonging to the crew CR, and operation places, or the like can be exemplified.

Each of the first equipment M1 and the second equipment M2 is operated by the operator OP. An operator tag TAG is attached to each operator OP. The operator tag TAG may be attached to the operator's clothing by a badge, or it may be hung from the neck. The operator tag TAG may perform information communication with the first equipment M1 or the second equipment M2 in the second communication method described above, or may perform information communication with the first equipment M1 or the second equipment M2 in other methods.

FIG. 2 is a diagram for describing work managed by the server device according to the embodiment. Work managed by the server device 30 will be described with reference to FIG. 2. FIG. 2 shows an example of a display screen output by the server device 30. A horizontal axis of FIG. 2 shows a time axis, and specifically shows a time period from 6:00 to 18:00 on Jul. 18, 2022 (Tuesday). In addition, a vertical axis of FIG. 2 shows each crew, and specifically shows a crew 1, a crew 2 and a crew 3.

Work according to the present embodiment is information that specifies a crew who has performed work, work time (a start time and an end time), and a work place. In FIG. 2, work W1 to work W4 are shown as work. A work name and a site name (positional information indicating that work has been performed) are described in a box indicating each work. In a description below, a site where work is performed may be referred to as a job site. Work W1 was performed by the crew 1 between 7:23 and 9:41. Work W2 was performed by the crew 1 between 9:47 and 14:10. Work W3 was performed by the crew 2 between 6:57 and 10:40. Work W4 was performed by the crew 2 between 11:05 and 13:56. In the shown example, work performed by the crew 3 is not shown.

Outline of Series of Operations of Management System

Figure 3:
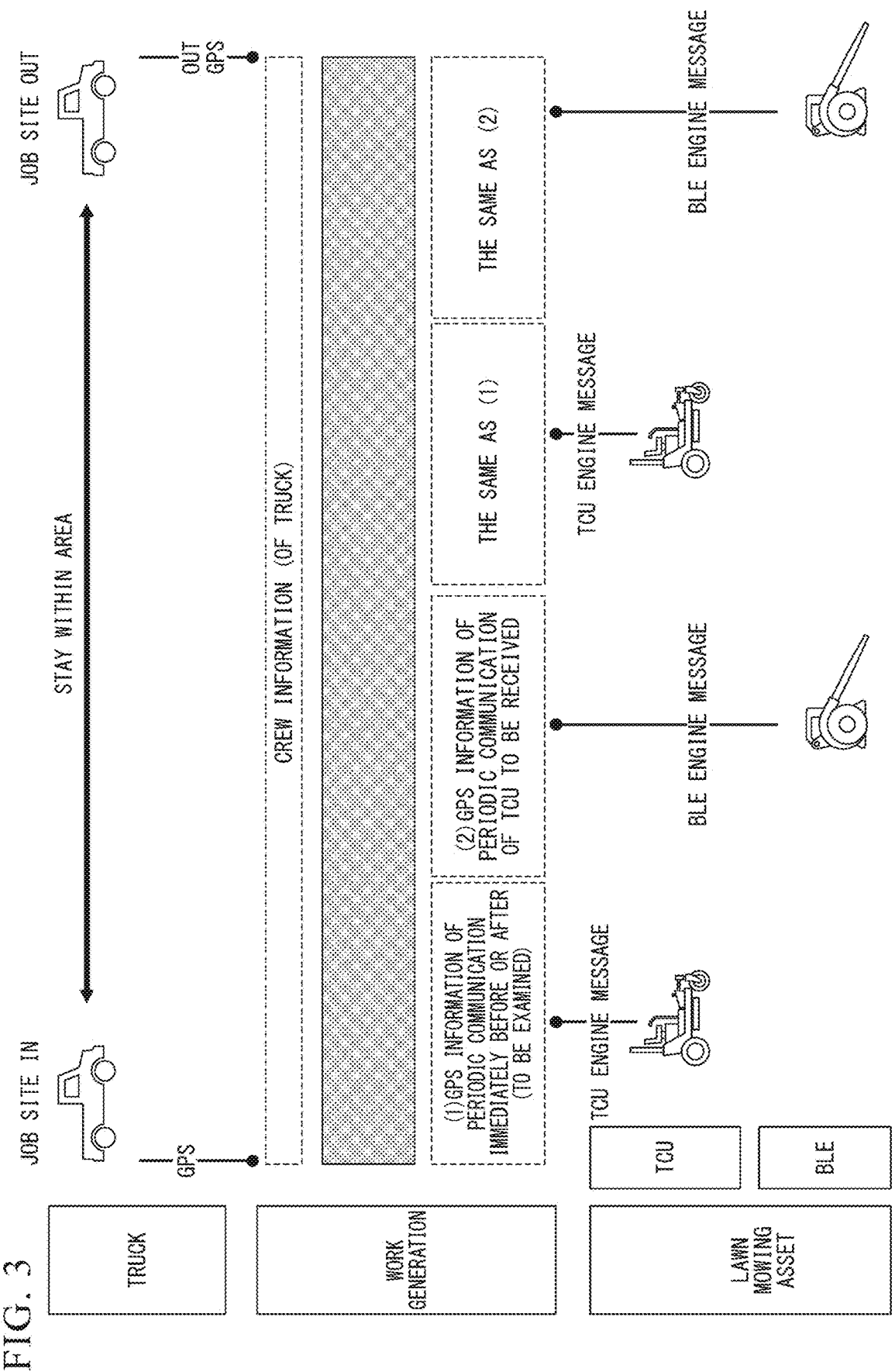
FIG. 3 is a diagram for describing an outline of a series of operations of the management system according to the embodiment.

FIG. 3 is a diagram for describing an outline of a series of operations of the management system according to the embodiment. An outline of a series of operations of the management system 1 will be described with reference to FIG. 3. A horizontal axis in FIG. 3 is a time axis, which shows a start to an end of one piece of work. In addition, FIG. 3 also shows a status of each piece of equipment. A truck and a TCU shown in FIG. 3 are an example of the first equipment M1. BLE shown in FIG. 3 is an example of the second equipment M2. In addition, an outline of work created by the server device 30 is shown in FIG. 3.

First, the server device 30 acquires positional information from a truck that is the specific first equipment M1 among the plurality of pieces of first equipment M1. Here, the server device 30 stores area information of a job site in advance. There are a plurality of job sites according to the present embodiment, and the server device 30 stores a range of position coordinates of each of the plurality of job sites. When the acquired positional information is in the range of position coordinates of any one of the job sites, the server device 30 detects that the truck has entered the job site. The server device 30 determines a time when the truck has entered the job site as a start time of work.

The truck is equipped with lawn mowing assets (equipment) such as TCU and BLE. When the operator OP arrives at a work site in the job site, it performs work using the lawn mowing assets such as TCU and BLE. At least one vehicle (for example, a truck as shown) is associated with each of the plurality of crews according to the present embodiment as the first equipment M1. That is, in the present embodiment, it can be said that the truck and the crew have a one-to-one correspondence.

The TCU, which is the first equipment M1, can acquire position coordinates at which a host device is present and can perform communication via Ethernet. Therefore, when the first communication device 10 corresponding to the first equipment M1 detects that an engine of the first equipment M1 is turned on, it outputs the position coordinates at which a host device is present and information indicating that the engine is turned on to the server device 30. The first communication device 10 may continue to output the information to the server device 30 periodically (for example, every minute) while the engine of the first equipment M1 is turned on.

The BLE, which is the second equipment M2, does not have a configuration for acquiring the position coordinates at which a host device is present, and does not have a configuration for performing communication via Ethernet, either. However, the second equipment M2 has a configuration for performing information communication in the second communication method such as BLE. Therefore, when the second communication device 20 corresponding to the second equipment M2 detects that an engine of the second equipment M2 is turned on, it outputs information indicating that the engine is turned on to the first communication device 10 in its vicinity in the second communication method. The second communication device 20 continues to output the information to the first communication device 10 periodically (for example, every minute) while the engine of the second equipment M2 is turned on. After acquiring the information from the second communication device 20, the first communication device outputs the acquired information to the server device 30.

The server device 30 acquires information on the operation status of the first equipment M1 and the second equipment M2 from the first communication device 10. The server device 30 manages information on an operation time of the first equipment M1 and the second equipment M2 in work based on the acquired information.

When work at the job site is completed, the crew loads the lawn mowing assets used for the work onto the truck and leaves the job site by moving using the truck. The server device 30 acquires positional information from the truck, and detects that the truck has exited the job site when the acquired position coordinates of the truck are out of the range of position coordinates of the job site. The server device 30 determines a time when the truck has exited the job site as an end time of work.

Functional Configuration of Second Communication Device

Figure 4:
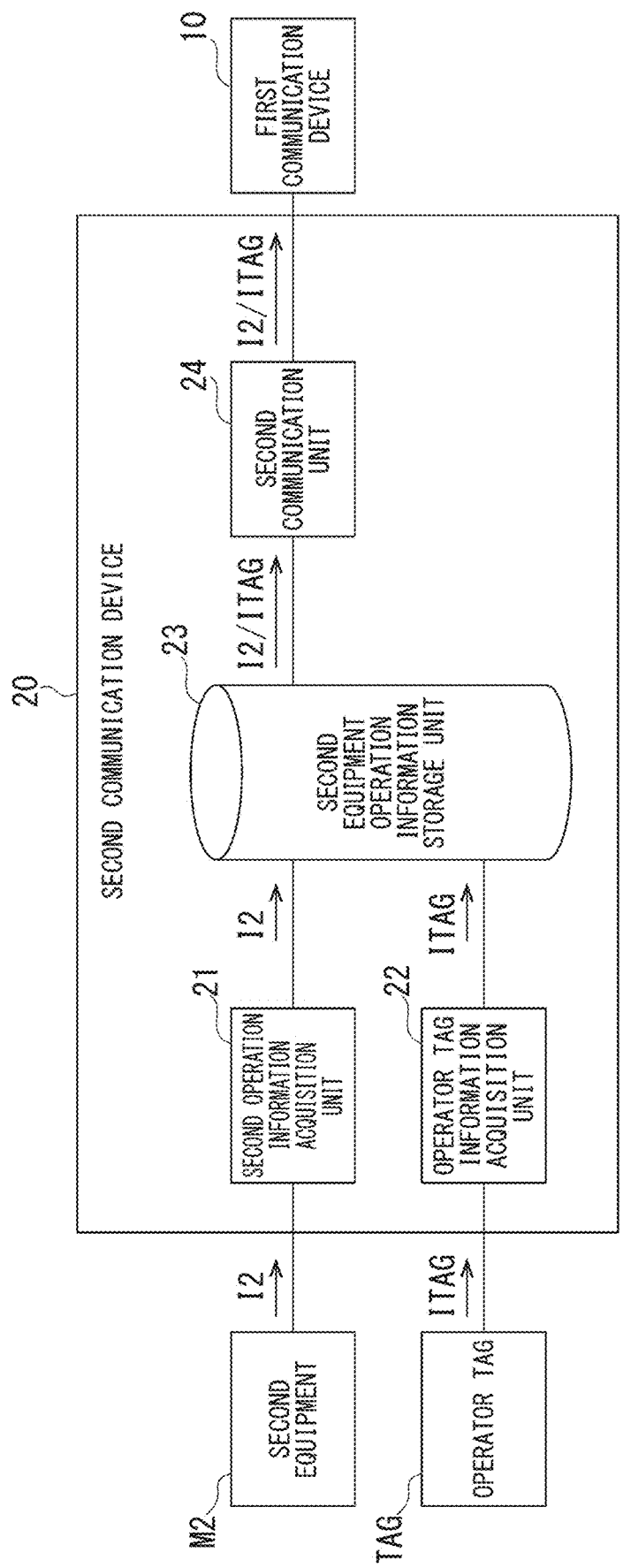
FIG. 4 is a functional configuration diagram for describing an example of the functional configuration of a second communication device according to the embodiment.

FIG. 4 is a functional configuration diagram for describing an example of a functional configuration of the second communication device according to the embodiment. An example of a functional configuration of the second communication device 20 will be described with reference to FIG. 4.

The second communication device 20 includes, for example, a second operation information acquisition unit 21, an operator tag information acquisition unit 22, a second equipment operation information storage unit 23, and a second communication unit 24. Each of these constituents is realized by, for example, a hardware processor such as a central processing unit (CPU) executing a program (software). In addition, some or all of these components may be realized by hardware (circuit units; including circuitry) such as large scale integration (LSI), an application specific integrated circuit (ASIC), a field-programmable gate array (FPGA), or a graphics processing unit (GPU), or by software and hardware in cooperation. The program may be stored in advance in a storage device (a storage device having a non-transitory storage medium) such as an HDD or flash memory of the second communication device 20, or may be stored in a removable storage medium such as a DVD or CD-ROM and installed in the HDD or flash memory of the second communication device 20 by the storage medium (non-transitory storage medium) being mounted in a drive device.

The second operation information acquisition unit 21 acquires the second equipment operation information I2, which is information on the operation status of the second equipment M2, from the second equipment M2. The second equipment operation information I2 may contain, for example, information on a time when the engine of the second equipment M2 is turned on, or information simply indicating that the engine of the second equipment M2 is turned on. The second operation information acquisition unit 21 stores the acquired second equipment operation information I2 in the second equipment operation information storage unit 23. When time information is not contained in the acquired second equipment operation information I2, the second operation information acquisition unit 21 may attach the time information to the second equipment operation information I2 and store it in the second equipment operation information storage unit 23.

The operator tag information acquisition unit 22 acquires operator tag information ITAG, which is information for identifying an operator OP that operates the second equipment M2, based on an operator tag TAG. The operator tag information ITAG may contain, for example, information on an operator tag TAG that is present in the vicinity of the second communication device 20 (a communicable distance with the second communication device 20). The operator tag information acquisition unit 22 stores the acquired information in the second equipment operation information storage unit 23.

The second equipment operation information storage unit 23 is configured to include storage devices such as an HDD and a flash memory. The second equipment operation information storage unit 23 stores the second equipment operation information I2 and the operator tag information ITAG. The second equipment operation information I2 and the operator tag information ITAG may be stored in association with the same time.

The second communication unit 24 has a configuration capable of performing communication in the second communication method. The second communication method is a communication method that enables one-to-one information communication with a partner present in a short distance with low power consumption. The second communication method may be, for example, a communication method based on the Bluetooth Low Energy (BLE) standard. The second communication unit 24 transmits the second equipment operation information I2 and the operator tag information ITAG stored in the second equipment operation information storage unit 23 to the first communication device 10 in the second communication method. Here, there are cases where the operator OP does not have an operator tag TAG attached thereto. In such a case, the operator tag information acquisition unit 22 cannot acquire the operator tag information ITAG. That is, the information transmitted by the second communication unit 24 does not necessarily contain the operator tag information ITAG, and may only need to contain at least the second equipment operation information I2.

Functional Configuration of First Communication Device

Figure 5:
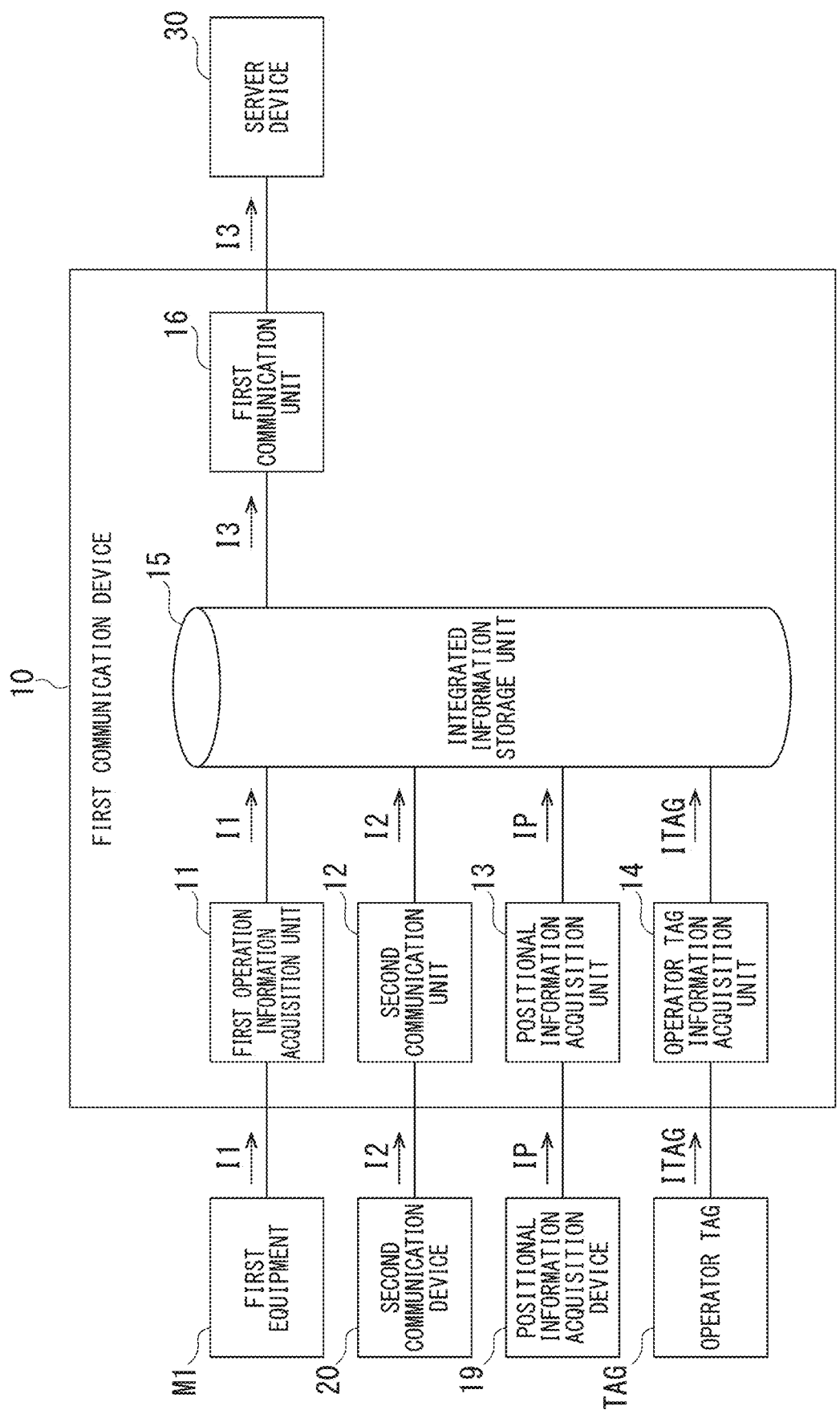
FIG. 5 is a functional configuration diagram for describing an example of the functional configuration of a first communication device according to the embodiment.

FIG. 5 is a functional configuration diagram for describing an example of a functional configuration of the first communication device according to the embodiment. An example of a functional configuration of the first communication device 10 will be described with reference to FIG. 5.

The first communication device 10 includes, for example, a first operation information acquisition unit 11, a second communication unit 12, a positional information acquisition unit 13, an operator tag information acquisition unit 14, an integrated information storage unit 15, and a first communication unit 16. Each of these constituents is realized by a hardware processor such as a CPU executing a program (software). In addition, some or all of these components may be realized by hardware (circuit units; including circuitry) such as LSI, ASIC, FPGA, GPU, or the like, or by software and hardware in cooperation. The program may be stored in advance in a storage device (a storage device having a non-transitory storage medium) such as the HDD or flash memory of the first communication device 10, or may be stored in a removable storage medium such as a DVD or CD-ROM and installed in the HDD or flash memory of the first communication device 10 by the storage medium (non-transitory storage medium) being mounted in the drive device.

The first operation information acquisition unit 11 acquires the first equipment operation information I1, which is information on the operation status of the first equipment M1, from the first equipment M1. The first equipment operation information I1 may contain, for example, information on a time when the engine of the first equipment M1 is turned on, or information simply indicating that the engine of the first equipment M1 is turned on. The first operation information acquisition unit 11 stores the acquired first equipment operation information I1 in the integrated information storage unit 15. When the acquired first equipment operation information I1 does not contain the time information, the first operation information acquisition unit 11 may attach the time information to the first equipment operation information I1 and store it in the integrated information storage unit 15.

The second communication unit 12 has a configuration that enables communication by the second communication method described above. The second communication unit 12 acquires the second equipment operation information I2 by performing information communication with the second communication device 20 by the second communication method. The second communication unit 12 stores the acquired second equipment operation information I2 in the integrated information storage unit 15. When the acquired second equipment operation information I2 does not contain time information, the first operation information acquisition unit 11 may attach the time information to the second equipment operation information I2 and store it in the integrated information storage unit 15.

The positional information acquisition unit 13 acquires information on the position coordinates at which a host device is present (referred to as positional information IP). The positional information acquisition unit 13 may acquire, for example, the positional information IP from a GPS acquisition device (not shown) capable of receiving radio waves from artificial satellites such as GPS. In addition, the positional information acquisition unit 13 itself may be configured to include a GPS acquisition device (not shown). The positional information acquisition unit 13 stores the acquired information in the integrated information storage unit 15.

The operator tag information acquisition unit 14 acquires the operator tag information ITAG, which is information for identifying an operator tag TAG corresponding to an operator OP that operates the first equipment M1, based on the operator tag TAG. The operator tag information ITAG may contain, for example, information on an operator tag TAG that is present in the vicinity of the first communication device 10 (a communicable distance with the first communication device 10). The operator tag information acquisition unit 14 stores the acquired information in the integrated information storage unit 15.

The integrated information storage unit 15 is configured to include storage devices such as an HDD and a flash memory. The integrated information storage unit acquires the first equipment operation information I1 from the first operation information acquisition unit 11, acquires the second equipment operation information I2 from the second communication unit 12, acquires the positional information IP from the positional information acquisition unit 13, and acquires the operator tag information ITAG from the operator tag information acquisition unit 14. The integrated information storage unit 15 stores these types of acquired information. The integrated information storage unit 15 may associate the acquired information with each other according to a time and store it as the integrated information I3.

The first communication unit 16 has a configuration capable of performing communication in the first communication method. The first communication method is a communication method that enables information communication via a predetermined communication network NW such as Ethernet. The first communication method is, for example, a communication method based on the Ethernet standard. The first communication unit 16 outputs the information stored in the integrated information storage unit 15 to the server device 30 as the integrated information I3. Here, there are cases where the second communication device 20 is not present in the vicinity, or where the operator OP does not have an operator tag TAG attached thereto. In other words, the integrated information I3 does not necessarily contain all the information stored in the integrated information storage unit 15, but may only need to contain at least the first equipment operation information I1 and the positional information IP. The integrated information I3 may preferably have the first equipment operation information I1, the second equipment operation information I2, and the positional information IP, which are associated with each other.

Functional Configuration of Server Device

Figure 6:
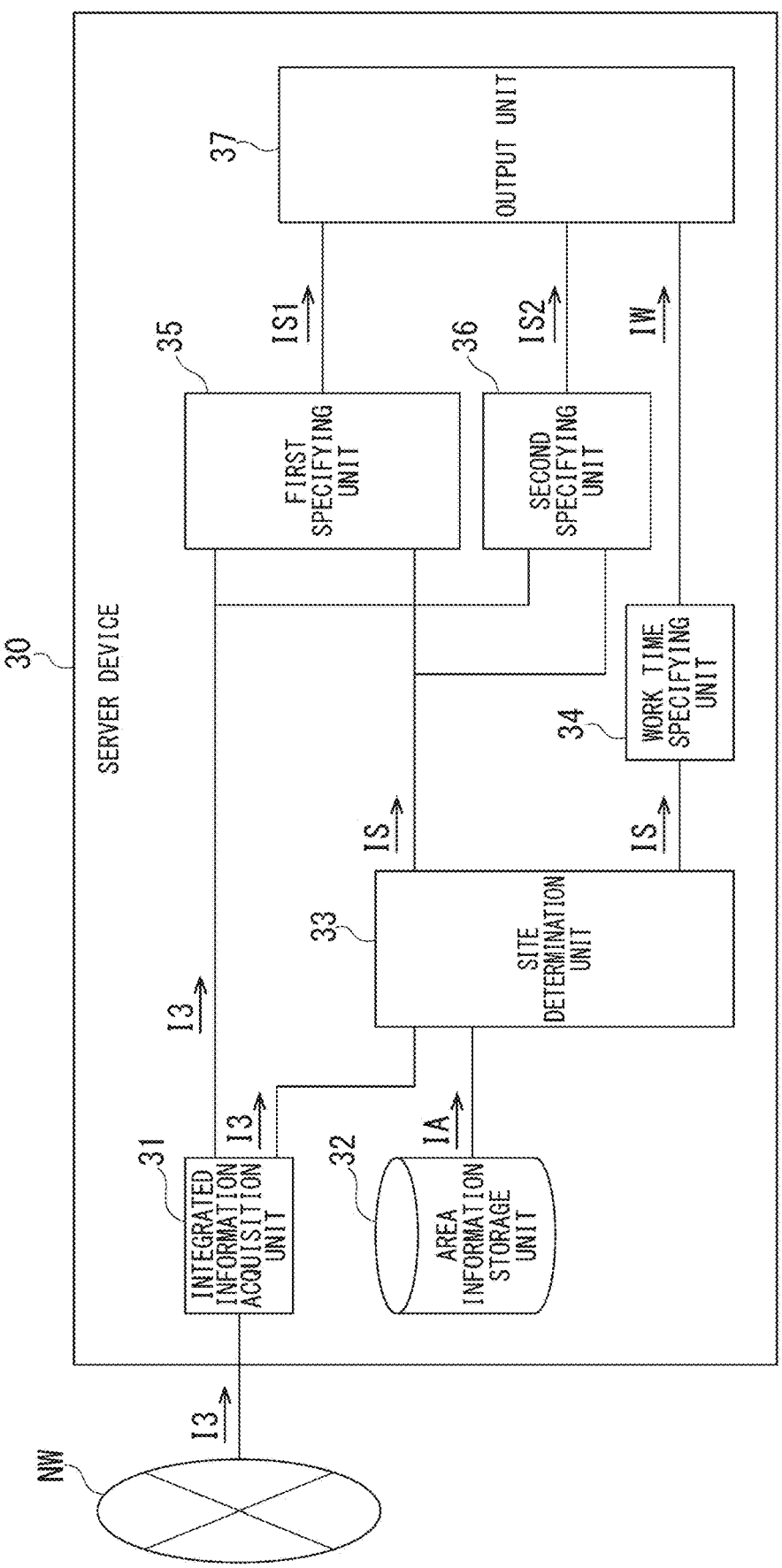
FIG. 6 is a functional configuration diagram for describing an example of the functional configuration of the server device according to the embodiment.

FIG. 6 is a functional configuration diagram for describing an example of a functional configuration of the server device according to the embodiment. An example of a functional configuration of the server device 30 will be described with reference to FIG. 6.

The server device 30 includes, for example, an integrated information acquisition unit 31, an area information storage unit 32, a site determination unit 33, a work time specifying unit 34, a first specifying unit 35, a second specifying unit 36, and an output unit 37. Each of these constituents is realized by a hardware processor such as a CPU executing a program (software). In addition, some or all of these components may be realized by hardware (circuit units: including circuitry) such as LSI, ASIC, FPGA, GPU, or the like, or by software and hardware in cooperation. The program may be stored in advance in a storage device (a storage device having a non-transitory storage medium) such as the HDD or flash memory of the first communication device 10, or may be stored in a removable storage medium such as a DVD or CD-ROM and installed in the HDD or flash memory of the first communication device 10 by the storage medium (non-transitory storage medium) being mounted in the drive device.

The integrated information acquisition unit 31 acquires the integrated information I3 from the first communication device 10 via a predetermined communication network NW. Specifically, the integrated information acquisition unit 31 has a configuration capable of performing communication in the first communication method, and acquires the integrated information I3 from the first communication device in the first communication method. The integrated information acquisition unit 31 outputs the acquired integrated information I3 to the site determination unit 33, the first specifying unit 35, and the second specifying unit 36.

The area information storage unit 32 stores area information IA for specifying an area of the job site where the crew works. The area information IA specifies, for example, the range of a job site according to position coordinates. Since there are a plurality of job sites in the present embodiment, the area information storage unit 32 stores information for specifying the range of each of the plurality of job sites according to position coordinates as the area information IA. The area information IA may specifically be geofence information (information indicating a virtual boundary created in an actual geographical area).

The site determination unit 33 acquires the integrated information I3 from the integrated information acquisition unit 31 and acquires the area information IA from the area information storage unit 32. The site determination unit 33 determines a site from which the integrated information I3 is transmitted based on the acquired information. To acquire the integrated information I3 transmitted from the plurality of first communication devices 10, the integrated information acquisition unit 31 determines the site from which the integrated information I3 is transmitted, based on the positional information IP contained in the integrated information I3 acquired from any one of the first communication devices 10. The site determination unit 33 outputs information on the determined site as site information IS.

The positional information contained in the integrated information I3 may be continuously transmitted at predetermined time intervals (for example, every minute) while the engine of the first equipment M1 is waken up. For example, even if normal positional information is not transmitted at a predetermined time interval due to communication failure or malfunction of a device, it is not considered that the device has exited the site immediately, and supplementation may be performed on the basis of information before and after. As the case where normal positional information is not transmitted, for example, it is possible to exemplify a case where the device is sleeping, or a case where the device is out of the area information IA stored by the area information storage unit 32 even if the positional information is transmitted.

In addition, when sites are adjacent to each other, especially when the first equipment M1 is present at a boundary portion between the sites, they may be determined to be different sites. In such a case, a site may be determined by a predetermined logic (for example, a site with the most information is considered).

The work time specifying unit 34 specifies the work time of crews at a predetermined job site. The work time is time from entering, by a vehicle serving as the first equipment M1, to exiting a job site. A predetermined job site is any one of the sites stored in the area information storage unit 32. The vehicle serving as the first equipment M1 is equipped with the first communication device 10. In the following description, the first communication device 10 provided in the vehicle is referred to as a specific first communication device 10. That is, the work time specifying unit 34 specifies time from entering, by the specific first communication device 10, to exiting the range of any one of the sites stored in the area information storage unit 32 as the work time of a crew to which the specific first communication device 10 belongs. The work time specifying unit 34 specifies the work time based on the positional information IA contained in the integrated information I3 transmitted from the specific first communication device 10 (the first communication device 10 provided in the vehicle) among the plurality of first communication devices 10 (including the first communication device 10 provided in the lawn mowing asset, and the like). That is, it can be said that the first communication device 10 used for specification of work time by the work time specifying unit 34 is the first communication device 10 corresponding to the first equipment M1, which is a vehicle. The first equipment M1, which is a vehicle, places and carries lawn mowing assets such as the first equipment M1 and the second equipment M2 on a carrier, and is, for example, a truck. The work time specifying unit 34 outputs information on the specified work time to the output unit 37 as work time information IW.

The first specifying unit 35 acquires the integrated information I3 from the integrated information acquisition unit 31 and acquires the site information IS from the site determination unit 33. The integrated information I3 contains the first equipment operation information I1, which is information on the operation status of the first equipment M1, and the site information IS contains job site information at a point to which the integrated information I3 is transmitted. There is A first specifying unit 35 specifies time and a place in which the first equipment M1 is used during work time based on the acquired information. The first specifying unit 35 outputs the specified information to the output unit 37 as first specifying information IS1.

The second specifying unit 36 acquires the integrated information I3 from the integrated information acquisition unit 31 and the site information IS from the site determination unit 33. The integrated information I3 contains the second equipment operation information I2, which is information on the operation status of the second equipment M2, and the site information IS contains job site information at a point to which the integrated information I3 is transmitted. The second specifying unit 36 specifies time and a place in which the second equipment M2 is used during work time based on the acquired information. The second specifying unit 36 outputs the specified information to the output unit 37 as second specifying information IS2.

The output unit 37 acquires the work time information IW from the work time specifying unit 34, the first specifying information IS1 from the first specifying unit 35, and the second specifying information IS2 from the second specifying unit 36. The output unit 37 outputs the acquired information as, for example, visually recognizable information. As the information output by the output unit 37, information having aspects as shown in FIG. 2 can be exemplified.

Operation of Management System

Figure 7:
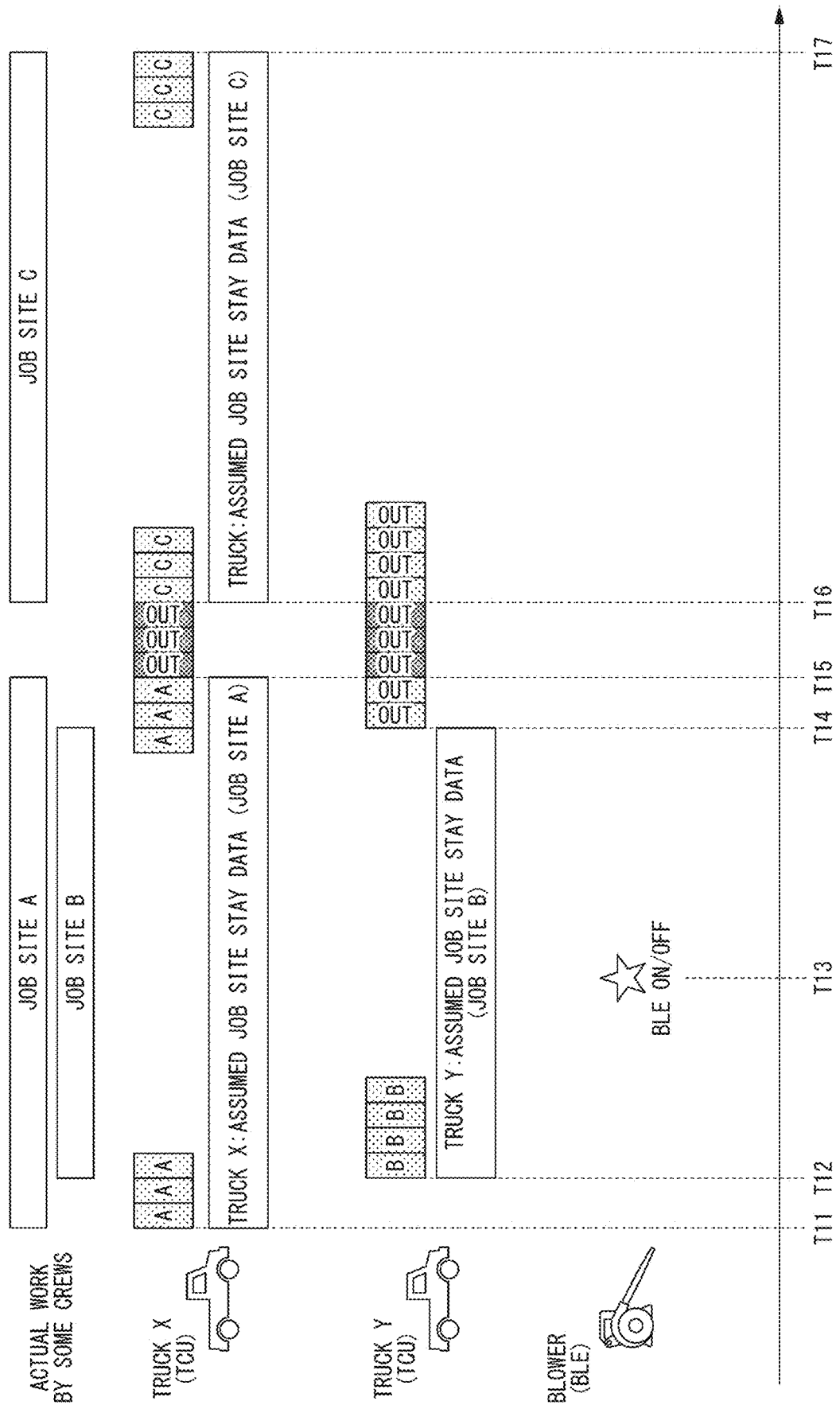
FIG. 7 is a diagram for describing a first example of a series of operations of the management system according to the embodiment.
Figure 8:
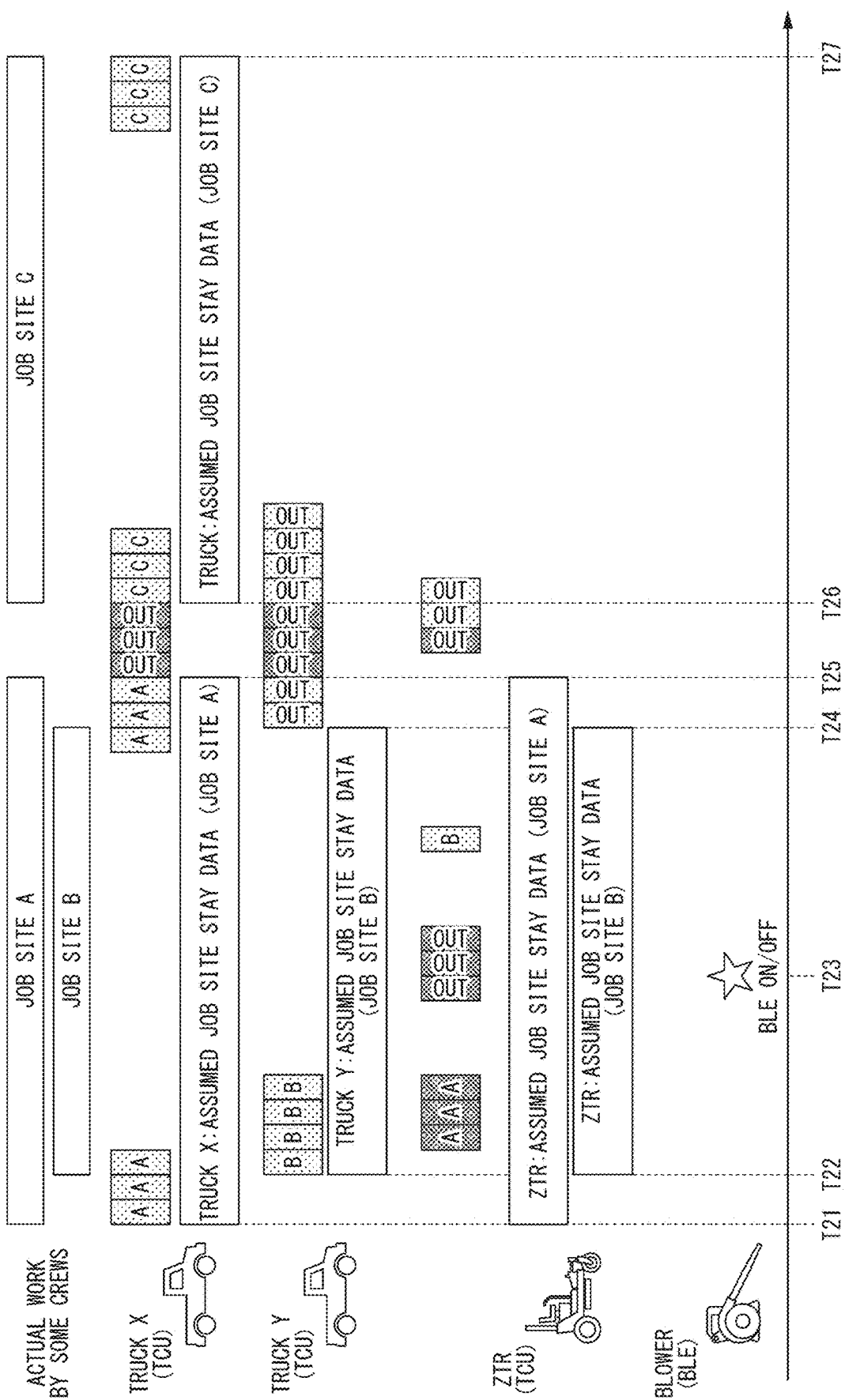
FIG. 8 is a diagram for describing a second example of a series of operations of the management system according to the embodiment.

Next, an example of an operation of the management system 1 will be described with reference to FIG. 7 to FIG. 9. In FIG. 7 and FIG. 8, a flow of an operation of the management system 1 will be described chronologically with the horizontal axis as a time axis.

FIG. 7 is a diagram for describing a first example of a series of operations of the management system according to the embodiment. First, a first example will be described with reference to FIG. 7. FIG. 7 shows work performed by two crews. In the shown example, a first crew is working using Truck X (vehicle) as the first equipment M1. In addition, a second crew is working using Truck Y (vehicle) as the first equipment M1. Moreover, the second crew is working using a Blower as the second equipment M2.

At a time t11, the integrated information I3 is transmitted from a first communication device 10 corresponding to Truck X as the first equipment M1 to the server device 30. The server device 30 detects that Truck X has entered a job site A based on the positional information contained in the integrated information I3, and specifies the time t11 as the start time of work.

At a time t12, the integrated information I3 is transmitted from a first communication device 10 corresponding to Truck Y as the first equipment M1 to the server device 30. The server device 30 detects that Truck Y has entered a job site B based on the positional information contained in the integrated information I3, and specifies the time t12 as the start time of work.

At a time t13, when the second communication device 20 corresponding to the Blower as the second equipment M2 detects that the engine of a device is turned on or off, the second equipment operation information I2 is transmitted to the first communication device 10 corresponding to Truck Y belonging to the same crew. The first communication device outputs the integrated information I3 to the server device 30 when it acquires the second equipment operation information I2. The server device 30 specifies a crew to which the Blower belongs and an operation time of the Blower based on the integrated information I3. Since the second communication method is short-distance communication, it is estimated that Truck Y and Blower are present in a short distance. Therefore, the server device 30 can determine the crew to which the Blower belongs in an assumption that the crew to which the Blower belongs is the same as the crew to which Truck Y, which has transmitted the information, belongs.

At a time t14, the integrated information I3 is transmitted from the first communication device 10 corresponding to Truck Y as the first equipment M1 to the server device 30. Based on the positional information contained in the integrated information I3, the server device 30 detects that Truck Y has exited the job site B, and specifies the time t14 as the end time of work.

At a time t15, the integrated information I3 is transmitted from the first communication device 10 corresponding to Truck X as the first equipment M1 to the server device 30. Based on the positional information contained in the integrated information I3, the server device 30 detects that Truck X has exited the job site A, and specifies the time t15 as the end time of work.

In addition, FIG. 7 shows that work is being performed at a job site C by Truck X even between a time t16 and a time t17.

FIG. 8 is a diagram for describing a second example of the series of operations of the management system according to the embodiment. Next, the second example will be described with reference to FIG. 8. The second example differs from the first example in that there is a ZTR (Zero-Turn Mower) as the first equipment M1. Here, since Truck (vehicle) is equipment that each crew has by one, it can be estimated that the second equipment M2 transmitted through the first communication device 10 corresponding to the Truck belongs to a crew to which the Truck belongs. However, in the case of the ZTR, it is not easy to specify which crew it belongs to. In particular, when two crews are working at positions close to each other (for example, at the same job site), it is not easy to specify which crew it belongs to. In the second example, one example of operation in such a situation will be described. In addition, in the second example, descriptions of items similar to those in the first example may be omitted. In the description in FIG. 8, a time t21 corresponds to the time t11, a time t22 corresponds to the time t12, a time t23 corresponds to the time t13, a time t24 corresponds to the time t14, a time t25 corresponds to the time t15, a time t26 corresponds to the time t16, and a time t27 corresponds to the time t17.

In the shown example, if the job site A and the job site B are different sites (sites present in geographically different places), based on the positional information transmitted from the ZTR, it is possible to specify which job site the ZTR is used in (that is, which crew has used it). However, when the job site A and the job site B are the same site, even if the positional information transmitted from the ZTR is confirmed, it is not easy to specify which job site the ZTR is used in (that is, which crew has used it). In the shown example, a case in which the job site A and the job site B are the same site (sites present in geographically the same place) will be described.

A first communication device 10 corresponding to the ZTR outputs the integrated information I3 between the time t22 and the time t24 and outputs its own operation information to the server device 30. Here, since Truck X and Truck Y are working within the same geographical range, it is not possible to determine which crew has used the ZTR. In this case, the server device 30 defines work time by a crew of Truck X and work time by a crew of Truck Y as assumed stay data (assumed job site stay data).

In addition, a second communication device 20 corresponding to the Blower outputs the second equipment operation information I2 between the time t22 and the time t24, and outputs its own operation information to the ZTR serving as the first communication device 10. For Blower, in a similar manner to the ZTR, it is not possible to determine which crew has used it. Therefore, the server device 30 defines the work time by the crew of Truck X and the work time by the crew of Truck Y as assumed stay data for the Blower in the similar manner to the ZTR.

Here, if either one of timings at which an engine of the ZTR or Blower is turned on or off is between the time t21 and the time t22, or between the time t24 and the time t25 (because it is not possible to work at the job site B before Truck Y enters or after it exits the job site B), it is determined that the ZTR or Blower has been used at the job site A.

In addition, when a timing at which the engine of the ZTR or Blower is turned on or off is between the time t22 and the time t23, it becomes even more difficult to determine a job site. In this case, the server device 30 may determine a job site on the basis of the operator tag information ITAG acquired from the operator tag TAG attached to an operator OP using the equipment. When the determination is made based on the operator tag information ITAG, operator identification information for identifying an operator OP and vehicle identification information for identifying a Truck may be associated in advance. The server device 30 specifies a job site corresponding to the operator tag information ITAG by referring to the operator tag information ITAG contained in the integrated information I3.

Figure 9:
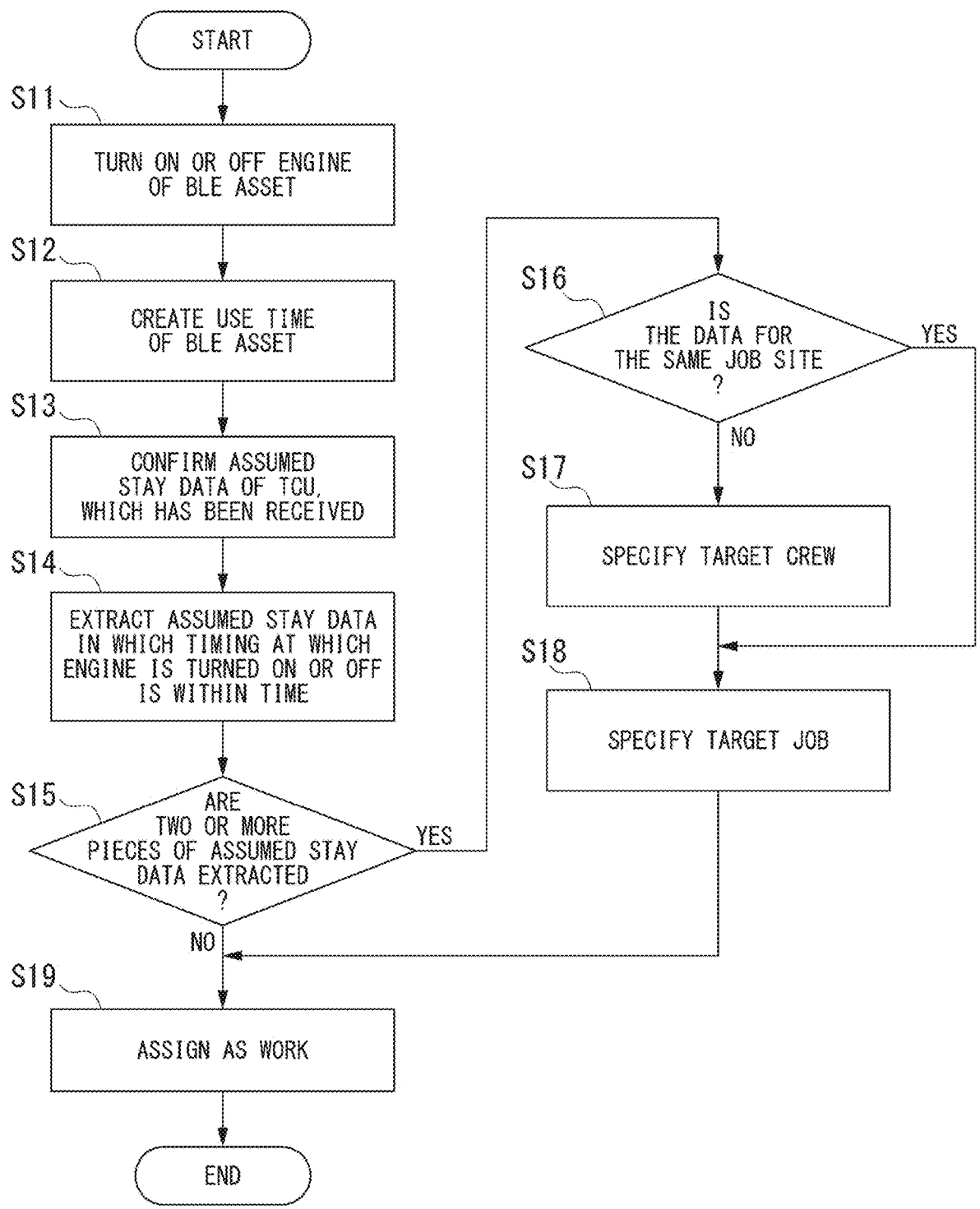
FIG. 9 is a flowchart of an example of the operation of the management system according to the embodiment.

FIG. 9 is a flowchart of an example of the operation of the management system according to the embodiment. With reference to FIG. 9, an example of an operation in a situation described in FIG. 8 will be described in detail.

(Step S11) First, the engine of the second equipment M2 corresponding to the second communication device 20 (for example, a lawnmower asset without a battery such as a Blower) is turned on or off. The second communication device 20 outputs information on turning on or off of the engine, as the second equipment operation information I2, to a nearest first communication device 10.

(Step S12) Next, when the first communication device 10 acquires the second equipment operation information I2 from the second communication device 20, it outputs the integrated information I3 to the server device 30, together with its own positional information. The server device 30 starts creating usage time of the second equipment M2 based on the acquired integrated information I3.

(Step S13) The server device 30 confirms assumed stay data of the first communication device 10, which has been received. Note that there may be one piece of assumed stay data, or there may be more than one.

(Step S14) The server device 30 extracts the assumed stay data in which the timing at which the engine of the second equipment M2 is turned on or off is within the time.

(Step S15) The server device 30 determines the number of pieces of the extracted assumed stay data. The server device 30 advances the processing to step S16 when two or more pieces of the assumed stay data are extracted (that is, YES in step S15). Moreover, the server device 30 advances the processing to step S19 when two or more pieces of the assumed stay data are not extracted (that is, NO in step S15).

(Step S16) The server device 30 determines whether the extracted two or more pieces of the assumed stay data are for job sites in the same geographical range. Specifically, when work time of a plurality of crews is specified at the same site (that is, two or more pieces of the assumed stay data are extracted), the second specifying unit 36 provided in the server device 30 specifies a crew who has operated the second equipment M2 depending on whether the plurality of crews are the same crew or not. When the extracted two or more pieces of the assumed stay data are for the same job site (that is, YES in step S16), the server device 30 advances the processing to step S18. When the extracted two or more pieces of the assumed stay data are not for the same job site (that is, NO in step S16), the server device 30 advances the processing to step S17.

(Step S17) When the two or more pieces of the assumed stay data are for different job sites, for example, the job sites may be adjacent to each other, and information may be transmitted from the second communication device 20 via the first communication device 10 present at the adjacent job site. That is, it can be said that a case where two or more pieces of the assumed stay data are for different job sites is an irregular case. In such a case, the server device 30 specifies the operator OP that has operated the second communication device 20 and species a crew to which the second equipment M2 belongs based on the operator tag information ITAG. In other words, when the work time of the plurality of crews are specified at the same site (that is, when two or more pieces of the assumed stay data are extracted), and when it is not clearly known which crew has operated the second equipment M2 (that is, NO in step S16), the second specifying unit 36 provided in the server device 30 specifies the crew that has operated the second equipment M2 based on the acquired operator tag information ITAG.

In addition, there may be cases in which the operator tag TAG is not attached to an operator, and in such cases, the operator tag information ITAG cannot be acquired. That is, since the operator tag information ITAG cannot be acquired, there are cases in which the crew that has operated the second equipment M2 cannot be specified. When the operator tag information ITAG cannot be acquired, information managed by the server device 30 may be used to specify the crew that has operated the second equipment M2. The information managed by the server device 30 may be correspondence information between an identification number of the second equipment M2 and a crew managing the second equipment M2. The server device 30 may use the correspondence information as a backup to specify the crew.

(Step S18) When the two or more pieces of the assumed stay data are for the same job site, the server device 30 specifies that work of the second equipment M2 is work at the job site.

(Step S19) The server device 30 assigns the specified job site as work.

Figure 10:
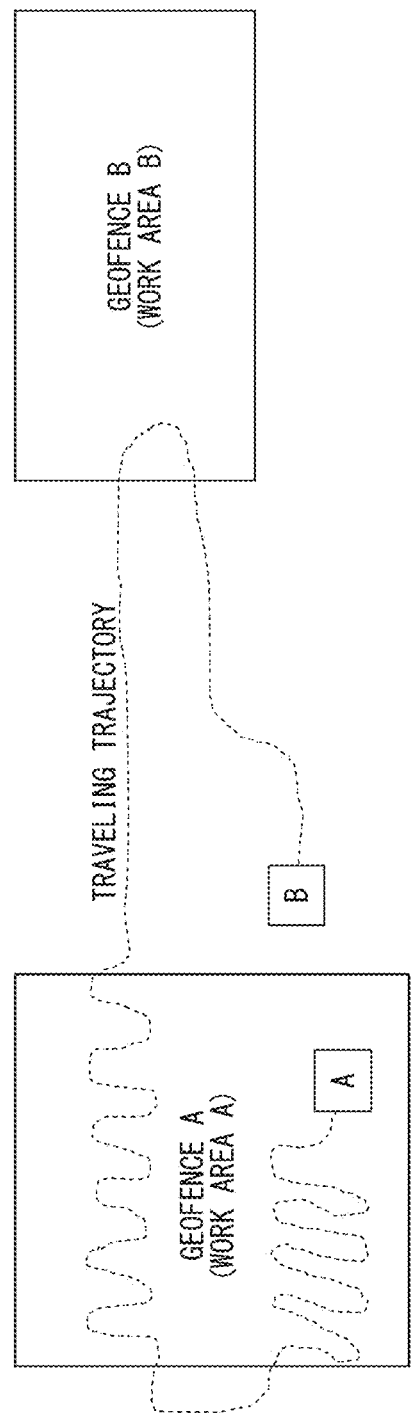
FIG. 10 is a diagram for describing an example of a travel trajectory of first equipment according to the embodiment.

FIG. 10 is a diagram for describing an example of a traveling trajectory of the first equipment according to the embodiment. An example of a traveling trajectory of the first equipment M1 will be described with reference to FIG. 10. FIG. 10 shows geographical ranges of two sites specified as geofence A (work area A) and geofence B (work area B). A point A is present within a range of the geofence A, and a point B is present outside the ranges of the geofence A and geofence B. In addition, a dashed line in FIG. 10 indicates the traveling trajectory when the first equipment M1 moves from the point A to the point B. Specifically, the first equipment M1 may be the ZTR (Zero-Turn Mower: riding lawn mower).

When the first equipment M1 is moving within the range of the geofence A (that is, the dashed line is within the range of the geofence A), the site determination unit 33 can determine that the first equipment M1 is within the range of the geofence A based on the positional information transmitted from the first communication device 10 corresponding to the first equipment M1 and the area information stored in the area information storage unit 32. Here, the first equipment M1 once leaves the range of the geofence A, and then returns to the range of the geofence A again. In such a case, it is conceivable that the site determination unit 33 determines that the first equipment M1 is out of the range of the geofence A, and erroneously determines that work has ended based on the positional information transmitted from the first communication device 10 corresponding to the first equipment M1 and the area information stored in the area information storage unit 32. However, even in such a case, the server device 30 does not immediately determine that work has ended, but regards a period of being outside the range of the geofence A as being present within the range of the geofence A, and determines that work continues. Whether work continues may be determined depending on, for example, the period of being outside the range of a site (how long it is separated from the site), the positional information (how far it is separated from the site), and the like.

In addition, in the shown example, the first equipment M1 once leaves the range of the geofence A, enters the range of the geofence B, which is an adjacent site, and leaves the range of the geofence B again. In such a case, it is conceivable that the site determination unit 33 determines that the first equipment M1 is present within the geofence B, and erroneously determines that work in the geofence A has ended and work in the geofence B has started, based on the positional information transmitted from the first communication device 10 corresponding to the first equipment M1 and the area information stored in the area information storage unit 32. Even in such a case, the server device 30 does not immediately determine that the work in the geofence A has ended and the work in the geofence B has started, regards a period of being outside the range of the geofence A as being within the geofence A, and determines that work continues. Whether work continues may also be determined depending on, for example, the period of being outside the range of a site, the positional information, and the like.

Summary of Embodiment

According to the embodiment described above, the management system 1 includes the plurality of first communication devices 10, the plurality of second communication devices 20, and one or more server devices 30.

The first communication device 10 acquires the first equipment operation information I1, which is information on the operation status of the first equipment M1, from the first equipment M1 by including the first operation information acquisition unit 11, acquires the second equipment operation information I2, which is information on the operation status of the second equipment M2, from the second communication device 20 by including a second communication unit 12, acquires the positional information IP on position coordinates at which a host device is present by including the positional information acquisition unit 13, and transmits the integrated information I3 in which the acquired first equipment operation information I1, second equipment operation information I2, and positional information IP are associated with each other in the first communication method by including the first communication unit 16.

The second communication device 20 acquires the second equipment operation information I2 from the second equipment M2 by including the second operation information acquisition unit 21, and transmits the acquired second equipment operation information I2 in the second communication method different from the first communication method by including the second communication unit 24.

The server device 30 acquires the integrated information I3 by including the integrated information acquisition unit 31, stores the area information IA that specifies the range of each of a plurality of sites according to the position coordinates by including the area information storage unit 32, determines a site from which the integrated information I3 is transmitted based on the positional information IP contained in the integrated information I3 acquired from any one of the first communication devices 10 by including the site determination unit 33, specifies time from entering, by the specific first communication device 10, to exiting a range of any one of sites stored in the area information storage unit 32 as work time of a crew to which the specific first communication device 10 belongs, based on the positional information IP contained in the integrated information I3 transmitted from the specific first communication device 10 (for example, the first communication device 10 attached to a vehicle) among the plurality of first communication devices 10 by including the work time specifying unit 34, specifies time and a place in which the first equipment M1 is used during the work time based on the first equipment operation information I1 contained in the integrated information I3 acquired from any one of the first communication devices 10 and a site determined by the site determination unit 33 by including the first specifying unit 35, and specifies time and a place in which the second equipment M2 is used during the work time based on the second equipment operation information I2 contained in the integrated information I3 acquired from any one of the first communication devices 10 and the site determined by the site determination unit 33 by including the second specifying unit 36.

The management system 1 includes the constituents as described above, thereby, even if there is equipment such as lawn mower that only has communication means in the second communication method, determining which crew has operated the equipment.

In addition, according to the embodiment described above, the second specifying unit 36 uses a concept of assumed stay data, thereby, when the work time of a plurality of crews is specified at the same site (that is, there are a plurality of pieces of assumed stay data at the same timing), specifying the crew that has operated the second equipment M2 depending on whether the plurality of crews are the same crew. Specifically, if the plurality of crews are the same crew, the second specifying unit 36 specifies that it is work by the crew, and if the plurality of crews are different crews, it does not determine that it is work by the crew. Therefore, according to the present embodiment, work can be specified even when a plurality of crews are working at the same job site.

Moreover, according to the embodiment described above, the first communication device 10 further includes the operator tag information acquisition unit 14 that acquires the operator tag information ITAG for identifying the operator tag TAG corresponding to the operator OP that operates the first equipment M1. When the work time of a plurality of crews is specified at the same site, and when it is not clearly known which crew has operated the second equipment M2, the second specifying unit 36 specifies the crew that has operated the second equipment M2 based on the operator tag information ITAG acquired by the operator tag information acquisition unit 14. That is, according to the present embodiment, even if the crew who has performed work using the second equipment M2 cannot be specified based on the positional information, it is possible to specify the crew that has performed the work using the second equipment M2 by using the operator tag TAG.

In addition, according to the embodiment described above, the first communication method is a communication method based on the Ethernet standard, and the second communication method is a communication method based on the BLE standard. Operation information of the second equipment M2 is transmitted to the first communication device 10 present in a short distance in the second communication method, and operation information of the first equipment M1 is transmitted to the server device 30 in the first communication method. Therefore, according to the present embodiment, even if the second communication device 20 cannot perform information communication based on the Ethernet standard, it is possible to transmit the operation information to the server device 30.

In addition, according to the embodiment described above, the first equipment M1 is equipment with a battery, and the second equipment M2 is equipment without a battery. The first communication device 10 capable of performing information communication in the first communication method based on the Ethernet standard is attached to the first equipment M1, and a second communication device 20 capable of performing information communication in the second communication method based on the BLE standard is attached to the second equipment M2. The second communication method based on the BLE standard consumes less power than the first communication method based on the Ethernet standard. Therefore, according to the present embodiment, it is possible to acquire operation information even from the second equipment M2 without a battery by information communication based on the BLE standard with low power consumption.

In addition, according to the embodiment described above, the first communication device 10 used by the work time specifying unit 34 to specify the work time is the first communication device 10 corresponding to the first equipment M1, which is a vehicle (for example, a truck), and the vehicle places and carries the first equipment M1 and the second equipment M2 on a carrier. Therefore, according to the present embodiment, it can be applied in a field where equipment such as a lawn mower is used by one vehicle.

In addition, according to the embodiment described above, at least one vehicle is associated with each of the plurality of crews as the first equipment M1. According to the server device 30, a crew can be specified on the basis of a vehicle.

As described above, a mode for implementing the present invention has been described using the embodiments, but the present invention is not limited to such embodiments at all, and various modifications and replacements can be added within a range not departing from the gist of the present invention.

EXPLANATION OF REFERENCES

1 Management system
10 First communication device
20 Second communication device
30 Server device
M1 First equipment
M2 Second equipment
OP Operator
TAG Operator tag
I1 First equipment operation information
I2 Second equipment operation information
I3 Integrated information
11 First operation information acquisition unit
12 Second communication unit
13 Positional information acquisition unit
14 Operator tag information acquisition unit
15 Integrated information storage unit
16 First communication unit
21 Second operation information acquisition unit
22 Operator tag information acquisition unit
23 Second equipment operation information storage unit
24 Second communication unit
31 Integrated information acquisition unit
32 Area information storage unit
33 Site determination unit
34 Work time specifying unit
35 First specifying unit
36 Second specifying unit 37 Output unit
NW Communication network

What is claimed is:

1. A management system that includes a plurality of first communication devices, a plurality of second communication devices, and one or more server devices, wherein a first communication device which is one of the plurality of communication devices, includes a first operation information acquisition unit configured to acquire first equipment operation information, which is information on an operation status of a first equipment, from the first equipment, a second communication unit configured to acquire second equipment operation information, which is information on an operation status of a second equipment, from the second communication device, a positional information acquisition unit configured to acquire positional information on position coordinates at which the first communication device itself is present, wherein the positional information of the first communication device is determined based on radio waves received from one or more artificial satellite, and a first communication unit configured to transmit integrated information in which the first acquired equipment operation information, the second acquired equipment operation information, and the acquired positional information of the first communication device, are associated with each other by a first communication method, the second communication device includes a second operation information acquisition unit configured to acquire the second equipment operation information from the second equipment, and the second communication unit configured to transmit the second acquired equipment operation information by a second communication method different from the first communication method, the server device includes an integrated information acquisition unit configured to acquire the integrated information, an area information storage unit configured to store area information that specifies a range of each of a plurality of sites, and a site determination unit configured to determine a site from which the integrated information is transmitted based on the positional information contained in the integrated information acquired from any one of the plurality of first communication devices, wherein, a site in which the second equipment is used is determined on the basis of a time, which is measured from when a specific one device among the plurality of first communication devices has been caused to enter within a range of any one of the plurality of sites stored in the area information storage unit, until the specific one device has been caused to exit from of the range of the any one of the plurality of sites, the specific one device is determined based on the positional information contained in the integrated information transmitted from the specific one device, and wherein the management system further comprising a work time specifying unit configured to specify the time, which is measured from when the specific one has been caused to enter within the range of the any one of the plurality of sites stored in the area information storage unit until the specific one device has been caused to exit from the range of the any one of the plurality of sites, as work time of a crew to which the specific one device belongs, based on the positional information contained in the integrated information transmitted from the specific one device.

2. The management system according to claim 1, wherein, during the time, which is from when the specific one device has entered the range of any one of sites stored in the area information storage unit until the specific one device has exited the range, it is assumed that the first communication device is present within the site.

3. The management system according to claim 1, further comprising:
a first specifying unit configured to specify a time and a place in which the first equipment is used during the work time, based on the first equipment operation information contained in the integrated information acquired from any one of the first communication devices and a site determined by the site determination unit; and
a second specifying unit configured to specify a time and a place in which the second equipment is used during the work time, based on the second equipment operation information contained in the integrated information acquired from any one of the first communication devices and a site determined by the site determination unit.

4. The management system according to claim 3, wherein, when the work time of a plurality of crews is specified at the same site, the second specifying unit specifies a crew that has operated the second equipment depending on whether a plurality of crews are the same crew.

5. The management system according to The management system according to wherein the first communication device further includes an operator tag information acquisition unit configured to acquire operator tag information for identifying an operator tag corresponding to an operator operating the first equipment, and when the work time of a plurality of crews is specified at the same site and when it is not clearly known which crew has operated the second equipment, the second specifying unit specifies a crew that has operated the second equipment based on the acquired operator tag information.

6. The management system according to claim 1, wherein the first communication method is a communication method based on an Ethernet standard, and the second communication method is a communication method based on Bluetooth Low Energy (BLE) standard.

7. The management system according to claim 1, wherein the first equipment is equipment that includes a battery, and the second equipment is equipment that does not include a battery.

8. The management system according to claim 1, wherein the first communication device used by the work time specifying unit to specify the work time is the first communication device corresponding to the first equipment, which is a vehicle, and the vehicle places and carries the first equipment and the second equipment on a carrier.

9. The management system according to claim 8, wherein at least one vehicle, as the first equipment, is associated with each of a plurality of crews.

10. A management method that manages a time and a place in which a plurality of first communication devices and a plurality of second communication devices are used by a server device, the method comprising: a first acquiring, by a first communication device, which is one of the plurality of first communication devices, first equipment operation information, which is information on an operation status of a first equipment, from the first equipment; a second acquiring, by the first communication device, second equipment operation information, which is information on an operation status of a second equipment, from the second communication device; a third acquiring, by the first communication device, positional information on position coordinates at which the first communication device itself is present, wherein the positional information of the first communication device is determined based on radio waves received from one or more artificial satellite; a first transmitting, by the first communication device, of integrated information in which the first acquired equipment operation information, the second acquired equipment operation information, and the acquired positional information of the first communication device are associated with each other by a first communication method; a fourth acquiring, by the second communication device, the second equipment operation information from the second equipment; second transmitting, by the second communication device, the second acquired equipment operation information in a second communication method different from the first communication method; a fifth acquiring, by the server device, the integrated information; a storing, by the server device, area information for specifying a range of each of a plurality of sites; determining, by the server device, a site from which the integrated information is transmitted based on the positional information contained in the integrated information acquired from any one of the plurality of first communication devices, wherein, a site in which the second equipment is used is determined on the basis of a time, which is measured from when a specific one device among the plurality of first communication devices has been caused to enter within a range of any one of the plurality of sites stored by the storing, until the specific one device has been caused to exit from the range of the any one of the plurality of sites, the specific one device is determined based on the positional information contained in the integrated information transmitted from the specific one device, and wherein the management method further comprising specifying the time, which is measured from when the specific one device has been caused to enter within the range of the any one of the plurality of sites stored in the area information storage unit until the specific one device has been caused to exit from the range of the any one of the plurality of sites, as work time of a crew to which the specific one device belongs, based on the positional information contained in the integrated information transmitted from the specific one device.

11. The management method according to claim 10, wherein, during the time, which is from when the specific one device has entered the range of any one of sites stored by the storing until the specific one device has exited the range, it is assumed that the first communication device is present within the site.

12. The management method according to claim 10, further comprising:
a first specifying a time and a place in which the first equipment is used during the work time, based on the first equipment operation information contained in the integrated information acquired from any one of the plurality of first communication devices and a site determined by the determining; and
a second specifying a time and a place in which the second equipment is used during the work time, based on the second equipment operation information contained in the integrated information acquired from any one of the plurality of first communication devices and a site determined by the determining.

* * * * *